E. L. GRONDAHL.
GAME APPARATUS.
APPLICATION FILED AUG. 13, 1912.

1,061,999.

Patented May 20, 1913.

WITNESSES

INVENTOR
Einar L. Grondahl
BY
ATTORNEYS

UNITED STATES PATENT OFFICE.

EINAR L. GRONDAHL, OF SEATTLE, WASHINGTON.

GAME APPARATUS.

1,061,999.  Specification of Letters Patent. Patented May 20, 1913.

Application filed August 13, 1912. Serial No. 714,796.

*To all whom it may concern:*

Be it known that I, EINAR L. GRONDAHL, a citizen of the United States, and a resident of Seattle, in the county of King and State of Washington, have invented a new and Improved Game Apparatus, of which the following is a full, clear, and exact description.

The object of the invention is to provide a new and improved game apparatus arranged to permit two, three or four persons to participate in the game and to afford considerable amusement and pastime to the players.

For the purpose mentioned use is made of a game board and counters, the game board having a central plain field and a series of differently colored fields grouped around the said plain center field, each colored field being subdivided into squares, and the squares in each colored field being provided with consecutive numbers, the said counters consisting of sets of counters and an extra counter, the sets of counters being colored to correspond to the fields, and the counters in each set being numbered consecutively to correspond to the numbers in the field, and the said extra counter and the said plain center field having corresponding numbers different from the numbers on the said sets of counters and the colored fields.

A practical embodiment of the invention is represented in the accompanying drawings forming a part of this specification, in which similar characters of reference indicate corresponding parts in all the views.

Figure 1:
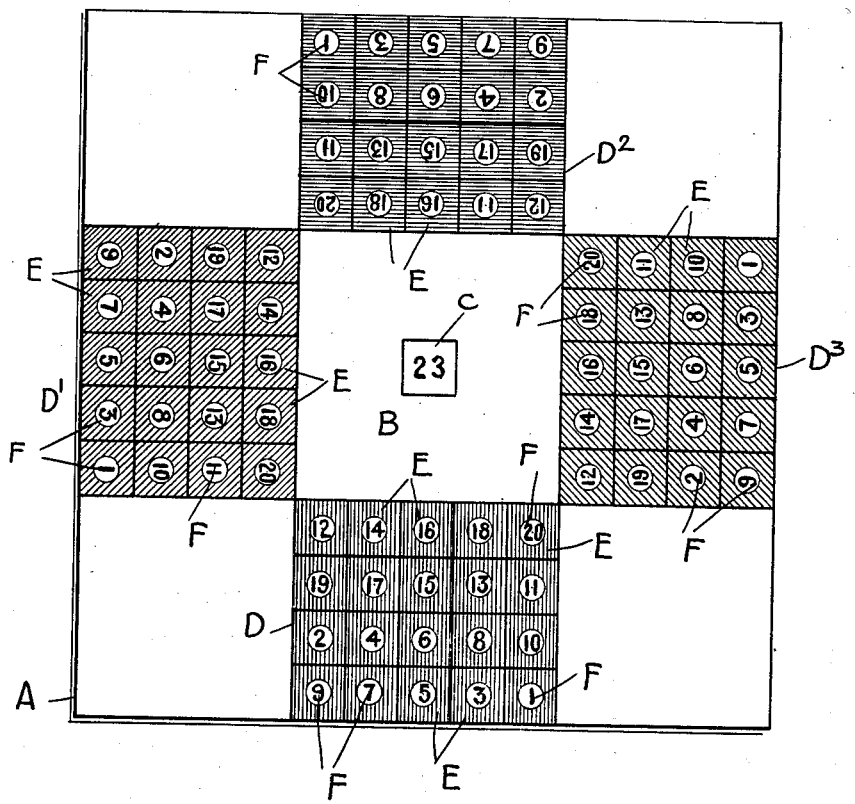
Figure 2:
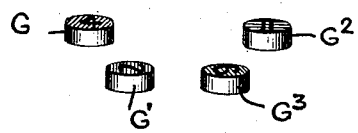
Figure 3:

Figure 1 is a plan view of the game board; Fig. 2 is a perspective view of some of the counters, one for each differently colored field; and Fig. 3 is a perspective view of the extra counter.

A suitably constructed game board A, of cardboard, wood or other suitable material, is provided on its face with a plain center field B having a number C marked thereon, preferably the number 23, as shown in Fig. 1. Around the center field B are grouped a number of fields D, D', D² and D³, differently colored (for instance, red, purple, blue and green), so as to readily distinguish the said fields D, D', D² and D³ from each other and from the center field B. Each of the fields D, D', D² and D³ is subdivided into small squares or similar figures E, and the squares in each field D, D', D² and D³ are provided with consecutive numbers F, say from 1 to 20, as indicated in Fig. 1. In addition to the game board A as described, use is made of sets of counters G, G', G² and G³, one set for each field D, D', D² and D³, and each set having as many counters as there are squares E in a field, and each set of counters is consecutively numbered corresponding to the numbers F in a field. Furthermore, the sets of counters are colored as shown (red, purple, blue and green), on their faces, corresponding to the colors of the fields D, D', D² and D³. A plain extra counter H is provided bearing a numeral corresponding to the numeral C, that is, as indicated in Fig. 3, the numeral 23.

To begin the game, the players arrange themselves opposite their respective fields D, D', D² or D³, and the counters of all the sets of counters G, G', G² and G³, are placed face downward on a table, each player drawing one counter. The player drawing the highest number starts the game. All the counters of the sets of counters G, G', G² and G³, as well as the extra counter H, are placed in a bag or other suitable receptacle, or are mixed on the table with the faces downward. The player who leads then draws one of the counters, and if the face of this counter is of the same color as the player's field then this drawn counter is placed on the field of the player and on the square E thereof bearing the same number, face up. The player now again draws another counter, and if the drawn counter is of the same color as the player's field then this second counter is likewise placed in the proper position on the player's field and the player continues until a counter is drawn colored differently from the color of the player's field, and this counter is placed on the correspondingly-colored field and on the square having the same numeral. The first player now stops drawing, and the player on whose field the last counter was placed now proceeds in the same manner as the first player. The player who first covers the even numbers of the player's field wins the hand, and it counts 20 if two are playing and 10 if three or four are playing, and to the score is added the sum total of all the odd numbered squares of the other players or player not covered by counters on the corresponding fields. The other players score the sum total only of their individual and own even squares not covered by counters. The player drawing the extra counter H places the same in the center field B and from his score is deducted the amount 23, and the privilege of drawing passes to the player seated to the right of the player who drew the extra counter. After the hand has been played and the score set down as described, the counters are again placed face down and mixed, and the player who has the lowest count plays first. Scores running to 100 if two play, and 150 if three play make a good game.

By providing the differently colored and subdivided fields and correspondingly colored counters, and playing the game in the manner set forth, highly interesting conditions are continuously developed as none of the players knows whose turn it will be until a counter is drawn of the corresponding color. By having the extra "hoodoo" counter H the interest in the game is greatly heightened.

Having thus described my invention, I claim as new and desire to secure by Letters Patent:

A game apparatus, comprising a game board and counters, the game board having a central plain field and a series of differently colored fields grouped around the said plain center field, each colored field being subdivided into squares and the squares in each colored field being provided with consecutive numbers, the said counters consisting of sets of counters and an extra counter, the sets of counters having faces colored corresponding to the fields and the counters in each set being numbered consecutively corresponding to the numbers in the fields, the said extra counter and the said plain center field having corresponding numbers different from the numbers on the said sets of counters and the colored fields.

In testimony whereof I have signed my name to this specification in the presence of two subscribing witnesses.

EINAR L. GRONDAHL.

Witnesses:
 HUGO CARLSON,
 L. T. WIRSTAD.